(12) United States Patent
Bastide et al.

(10) Patent No.: US 10,996,741 B2
(45) Date of Patent: May 4, 2021

(54) AUGMENTED REALITY CONVERSATION FEEDBACK

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert E. Loredo, North Miami Beach, FL (US); SathyaNarayanan Srinivasan, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/702,280

(22) Filed: Sep. 12, 2017

(65) Prior Publication Data

US 2019/0079579 A1 Mar. 14, 2019

(51) Int. Cl.
*G06F 3/01* (2006.01)
*G06Q 50/00* (2012.01)
(Continued)

(52) U.S. Cl.
CPC .......... *G06F 3/011* (2013.01); *G06F 16/9535* (2019.01); *G06F 40/30* (2020.01);
(Continued)

(58) Field of Classification Search
None
See application file for complete search history.

(56) References Cited

U.S. PATENT DOCUMENTS 9,521,252 B2 12/2016 Leeds et al.
10,122,843 B2 * 11/2018 Todasco ................. H04W 4/21
(Continued)

FOREIGN PATENT DOCUMENTS

WO 2015089336 A2 6/2015

OTHER PUBLICATIONS

Anonymous, "Method to Enhance Control and Management of Electronic Conversations Using Collaborative Moderation and Visual Representation of the Conversation Structure and Continuity," An IP.com Prior Art Database Technical Disclosure, Jul. 23, 2012, p. 1-7, IP.com No. IPCOM000220110D.
(Continued)

*Primary Examiner* — Jeffrey J Chow
(74) *Attorney, Agent, or Firm* — L. Jeffrey Kelly (57) ABSTRACT

A method, computer system, and a computer program product for interpreting conversation engagement is provided. The present invention may include receiving, by an augmented reality device, an input, wherein the augmented reality device is associated with a user. The present invention may also include processing the received input. The present invention may then include analyzing the input based on the processed input. The present invention may further include determining that the user is engaged in a conversation with an individual based on the analyzed input. The present invention may also include capturing a plurality of core parameters between the user and the individual based on the determined engaged conversation. The present invention may then include analyzing the captured plurality of core parameters. The present invention may further include delivering a representation of the analyzed plurality of core parameters to the user on the augmented reality device.

20 Claims, 5 Drawing Sheets

(51) Int. Cl.
    *G06F 16/9535*     (2019.01)
    *G06F 40/30*     (2020.01)
    *H04M 1/65*     (2006.01)
    *H04M 1/725*     (2021.01)

(52) U.S. Cl.
    CPC .............. *G06Q 50/01* (2013.01); *H04M 1/65* (2013.01); *H04M 1/72563* (2013.01); *H04M 2201/50* (2013.01)

(56) References Cited

U.S. PATENT DOCUMENTS

| | | | |
|---|---|---|---|
| 2012/0004915 A1* | 1/2012 | Sato | G10L 25/78 704/270 |
| 2013/0044130 A1* | 2/2013 | Geisner | G09G 5/00 345/633 |
| 2014/0081634 A1* | 3/2014 | Forutanpour | G06F 17/289 704/235 |
| 2014/0176603 A1 | 6/2014 | Kumar et al. | |
| 2014/0306994 A1* | 10/2014 | Brown | G06T 19/006 345/633 |
| 2015/0154291 A1* | 6/2015 | Shepherd | G06F 17/30861 707/748 |
| 2015/0242755 A1* | 8/2015 | Gross | G06F 17/30867 706/46 |
| 2015/0243083 A1* | 8/2015 | Coggins | G06T 11/00 345/633 |
| 2015/0261867 A1 | 9/2015 | Singal et al. | |
| 2016/0049094 A1* | 2/2016 | Gupta | G09B 19/04 434/185 |
| 2016/0352902 A1* | 12/2016 | Raanani | G10L 17/02 |
| 2017/0168566 A1* | 6/2017 | Osterhout | G06F 3/012 |

OTHER PUBLICATIONS

Anonymous, "System and Method for Interpreting and Communicating Emotions During Electronic Communication," An IP.com Prior Art Database Technical Disclosure, Jan. 31, 2014, p. 1-2, IP.com No. IPCOM000234726D.

Anonymous, "Apparatus and Approach to Reduce Message Loss During Unstable Teleconference," An IP.com Prior Art Database Technical Disclosure, Nov. 15, 2016, p. 1-5, IP.com No. IPCOM000248278D.

Anonymous, "A Technique for Communicating with a Patient Using Augmented Reality Visual Cues," An IP.com Prior Art Database Technical Disclosure, Dec. 14, 2016, 5 Pages, IP.com No. IPCOM000248529D.

Greenwald et al., "EVA: Exploratory Learning with Virtual Companions Sharing Attention and Context," IEEE 16th International Conference on Advanced Learning Technologies (ICALT), Jul. 25-28, 2016, p. 26-30, IEEE Computer Society.

Mell et al., "The NIST Definition of Cloud Computing," National Institute of Standards and Technology, Sep. 2011, p. 1-3, Special Publication 800-145.

Ofek et al., "Reducing Disruption from Subtle Information Delivery during a Conversation: Mode and Bandwidth Investigation," CHI 2013, Apr. 27-May 2, 2013, 10 Pages, ACM, Paris, France.

Vaithyanathan et al., "A Method and System for Providing Chat Hints relevant to Content of the Chat," An IP.com Prior Art Database Technical Disclosure, Jan. 24, 2014, p. 1-3, IP.com No. IPCOM000234641D, Yahoo!.

* cited by examiner

AUGMENTED REALITY CONVERSATION FEEDBACK

BACKGROUND

The present invention relates generally to the field of computing, and more particularly to augmented reality.

Augmented reality vendors are driving changes in user behavior by combining reality with an augmented reality in the form of computer generated features. The combination may change or amplify an individual's perception of reality. Augmented reality may be used to combine reality with video games or augmented reality may create possibilities to enhance real life events and social interactions.

SUMMARY

Embodiments of the present invention disclose a method, computer system, and a computer program product for interpreting conversation engagement. The present invention may include receiving, by an augmented reality device, an input, wherein the augmented reality device is associated with a user. The present invention may also include processing the received input. The present invention may then include analyzing the input based on the processed input. The present invention may further include determining that the user is engaged in a conversation with an individual based on the analyzed input. The present invention may also include capturing a plurality of core parameters between the user and the individual based on the determined engaged conversation. The present invention may then include analyzing the captured plurality of core parameters. The present invention may further include delivering a representation of the analyzed plurality of core parameters to the user on the augmented reality device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for providing feedback during conversations to improve conversation engagement between individuals. As such, the present embodiment has the capacity to improve the technical field of augmented reality by providing feedback to an augmented reality device user during a conversation with one or more other individuals. More specifically, the augmented reality device may receive, capture and analyze core parameters related to individuals during a conversation to quantify the level of engagement between individuals.

As previously described, augmented reality vendors are driving changes in user behavior by combining reality with an augmented reality in the form of computer generated features. The combination may change or amplify an individual's perception of reality. Augmented reality may be used to combine reality with video games or augmented reality may create possibilities to enhance real life events and social interactions.

Virtual reality may create an artificial world for an individual looking into a virtual reality headset. The virtual reality images may create realistic images, sounds and sensations for an individual to experience an artificial world. Augmented reality may combine reality with a virtual environment by using real time events and overlapping additional information over the real-time events. Combining live situations with digital markers may enable useful information to be presented to a user for the user to act upon the useful information in a live setting. Additionally, live digital markers may be used to overlap digital markers on live streaming displays such as television and live streaming computer and handheld device applications.

Altering the human experience with augmented reality may enhance human interaction. For instance, people engaged in conversation in a social setting, such as a business gathering, may have varying levels of interest and connections with other individuals in the conversations. The varying levels of interest may be apparent by each individual's features, such as tone of voice, eye contact, facial expressions, body language or biometric features. Online social networks may add quantifiable data to how humans connect with each other by tracking social media posting updates and impacts. Communication among individuals may inadvertently provide positive, neutral or negative impressions on others, therefore, it may be advantageous to, among other things, provide feedback to an individual in real time to inform the individual using an augmented reality device of the impact or communication distance that has been created between the individual and the other communicators (i.e., other individuals in the conversation).

According to at least one embodiment, feedback may be provided to an individual using an augmented reality enabled device. Feedback may, for example, be overlapping additional information presented on an augmented reality device in the form of eyeglasses or smart glasses. An augmented reality enabled device may operate with and communicate with hardware devices such as a computer, a server, a smartphone or tablet over a communication network. An augmented reality device and a hardware device may operate one software application program or multiple software application programs and may communicate, via a communication network, with other devices such as monitors, cameras, sensors, head-mounted displays, eyeglasses (i.e., smart glasses), eye pieces (e.g., devices embedded on a contact lens), handheld devices, retina displays, and tracking devices (e.g., global positioning systems (GPS), accelerometers, sensors, or compasses). A camera and sensor may capture up to a 360 degree view. Augmented reality devices may also communicate, via a communication network, with other augmented reality devices or with IoT (Internet of Things) sensor devices in addition to communicating with various applications (e.g., social media applications, email applications, task manager applications, calendar applications, video communication applications, GPS applications or text messaging applications). Augmented reality enabled devices may also use virtual reality devices such as a virtual reality headset or haptic feedback devices attached to a user's body to feel real life feelings of touch, vibrations or motions by applying force.

The present embodiment may deliver instantaneous feedback to a user, using an augmented reality device, by determining who is engaged in the conversation. In order to determine which individuals are engaged in conversation, the augmented reality conversation program may activate an augmented reality device to scan the visible area, for example using a camera, sensor and facial recognition software, to determine the direction the individuals are facing in the visible area and to determine if eye contact is being made. Once a determination is reached regarding which individuals are engaged in a conversation, the augmented reality conversation program may identify core parameters relating to the individuals who are communicating.

One core parameter may include various types of quantifiable data relating to a user's social media accounts, such as the level of social media connections (e.g., a direct friend may be given more weight and assigned a higher number or score than a friend associated with a friend who is not a direct social media connection), the number of common interests, the number of common events attended, the amount of time spent communicating either direct communication or messaging communication, the number of messages exchanged (e.g., text messages, email messages, social media personal direct messages or social media posted messages), and occupational interests (e.g., networking social media applications). Other core parameters may include various types of quantifiable data such as the physical proximity between the individuals in communication, the communication distance (i.e., quantifying a degree of engagement between the user and one or more other individuals) between mutual friends or professional connections, firm or company level communication distance (i.e., quantifying a degree of engagement between one or more companies and the companies employees), feedback from an individual after meeting each other, the quality of conversation (e.g., meaningful conversation exchanged), wearable and health device feedback (e.g., a device that tracks heartbeat, breathing or pupil dilation), a device that tracks and stores ambient noise, or a social graph and directions in the augmented reality layout of the social graph.

The quality of conversation may be analyzed using Natural Language Processing (NLP). The augmented reality conversation program may receive both structured data and unstructured data. Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content. The received data may be processed through NLP to extract information that is meaningful to a user operating the augmented reality device. An NLP system may be created and trained by rules or machine learning. An example of how the augmented reality conversation program may use the NLP process may include determining that a text regarding a football game over the weekend may carry less weight than a conversation about market share prices in the stock market.

Semantic analysis may be used to infer the complexity of interactions, such as the meaning and intent of the language, both verbal and non-verbal (e.g., spoken word captured by a microphone during a conversation and processed on an augmented reality device or type written words captured on social media accounts). Semantic analysis may consider a user's current and historical activities to associate importance to a conversation, for example, the frequency in which the user discussed a certain topic may provide more weight or a higher score to the analysis. Semantic analysis may also consider syntactic structures at various levels to infer meaning to a user's phrases, sentences and paragraphs. Static data may also be considered through semantic analysis, for example, when the augmented reality device receives raw data from software applications and filters the data into meaningful data.

Sentiment or emotive analysis may be used to understand how communication may be received by a user or interpreted by an individual the user is communicating with. Sentiment analysis may be processed through, for example, voice identifier software received by a microphone on the augmented reality device, facial expression identifier software received by a camera on the augmented reality device or by biometric identifier software received by the augmented reality device (e.g., a wearable device that communicates with the augmented reality device such as a smart watch that measures heartrate or a camera attached to the augmented reality device that measures pupil dilation). Sentiment may also be measured by the tone of voice of the individuals communicating and the syntactic tone in written messages, such as emails and social media posts.

The augmented reality conversation program may continuously analyze the core parameters as the individuals communicate to develop a communication distance and continuously deliver a representation of the communication distance. A representation of the communication distance may be presented, for example, as overlapping data viewable by the user on augmented reality glasses in the form of colors, number values or words associated with the individual the user is communicating with. The overlapping data may display in the form of a message overlay in the viewable area for the user on the glasses, such as a color shade over an individual whom the user is communicating with (e.g., a green color overlay may signify a meaningful conversation, a yellow color overlay may be considered a neutral conversation and a red color overlay may signify a non-meaningful conversation).

The augmented reality conversation program may display feedback to the user based on non-verbal or physiological clues undetectable by the user, such as biometric data obtained and analyzed. Biometric data may be obtained by a wearable device (e.g., a smart watch with sensors, lasers or a camera) and biometric identifiers may include a heartbeat, breathing or pupil dilation. The impact of the conversation and engagement level between the individuals communicating may be quantified. A communication distance may quantify the level of engagement through the analysis of core parameters. Enhanced group dynamics may also be provided through the analysis of core parameters. The augmented reality conversation program feedback display may provide the user with information (e.g., overlay colors or type written messages on the visual area of the augmented reality device such as smart glasses) to maximize the engagement of the conversation in real time to foster better relationships. Additionally, the program database may become more robust as the collaboration portfolio (e.g., database or storage medium) and augmented reality portfolio (e.g., database or storage medium) acquire more conversations, user experiences and data.

The augmented reality conversation program may monitor the direction and intention of a conversation to overlay a conversation engagement metric that may indicate a willingness and ability to speak on a particular topic. The augmented reality device may display feedback to the user in real time during the present conversation, whether in close physical proximity or over video communication (e.g., video telephone call or video conference call that uses a camera to capture the individual's facial features and a microphone to capture the individual's audio features). The augmented reality device may receive input from the real time present conversation and the augmented reality conversation program may produce a metric for the augmented reality device to notify the user with the metric indicative of satisfaction and interest level in the conversation for the user to have the ability to improve the conversation or to end the conversation. The augmented reality conversation program may provide a way to offer feedback to a user regarding the level of engagement (i.e., to interpret or improve the level of engagement) that is presented in a conversation to allow the user to adjust the user's approach to the conversation with a particular individual.

The present embodiment may be used for one on one conversations or for multiple conversations in a crowded room. The provided metric or feedback of the one or more individuals engaged in a conversation with the user may alert the user if the interest level in a conversation drops below a threshold. The alert may, for example, be a change of a shading of color or a written message on the augmented reality device that displays the conversation interest level has been lowered (i.e., the individual became less interested in the conversation).

Figure 1:
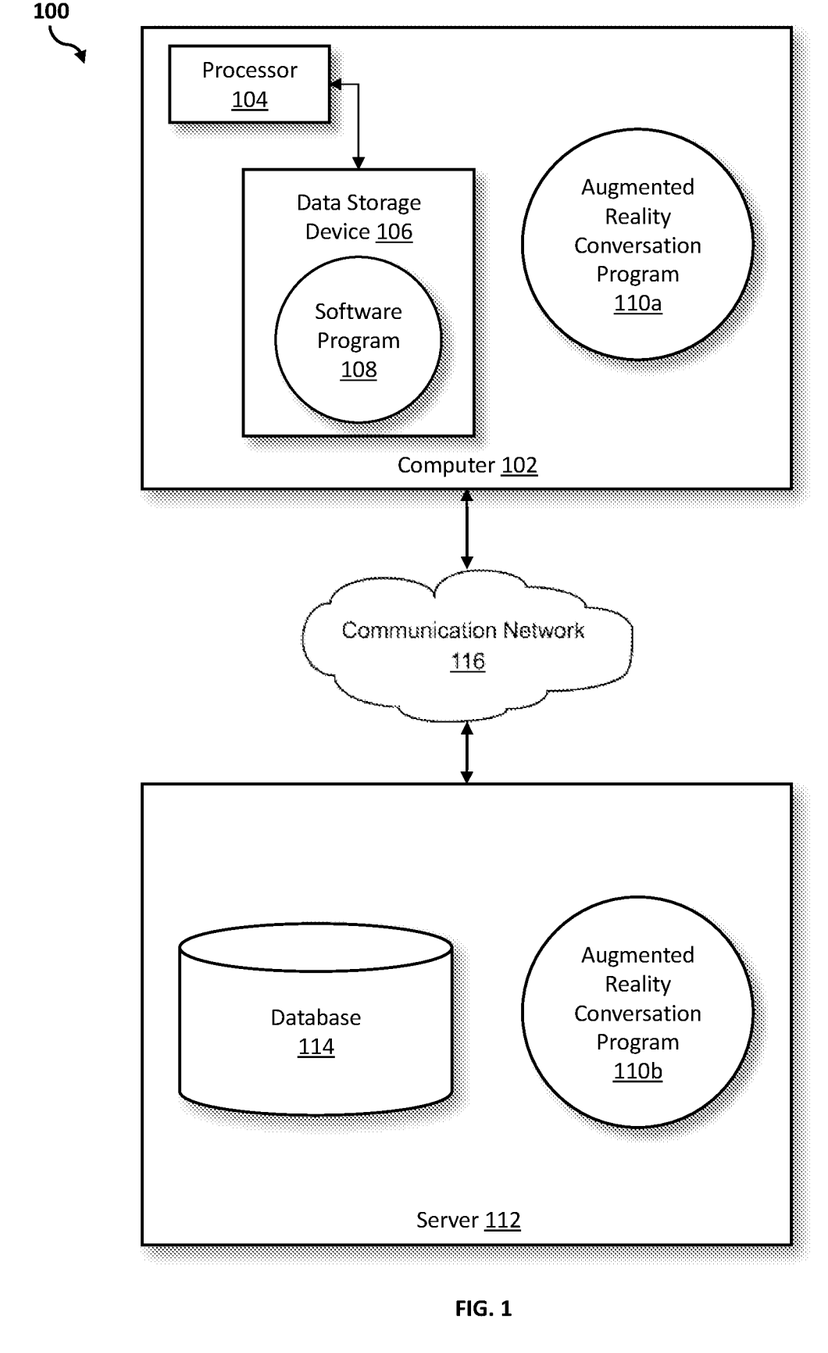
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an augmented reality conversation program 110a. The networked computer environment 100 may also include a server 112 that is enabled to run an augmented reality conversation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the augmented reality conversation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the augmented reality conversation program 110a, 110b (respectively) to obtain instantaneous feedback on an augmented reality device regarding the level of interest among individuals in a conversation. The augmented reality conversation feedback method is explained in more detail below with respect to FIG. 2.

Figure 2:
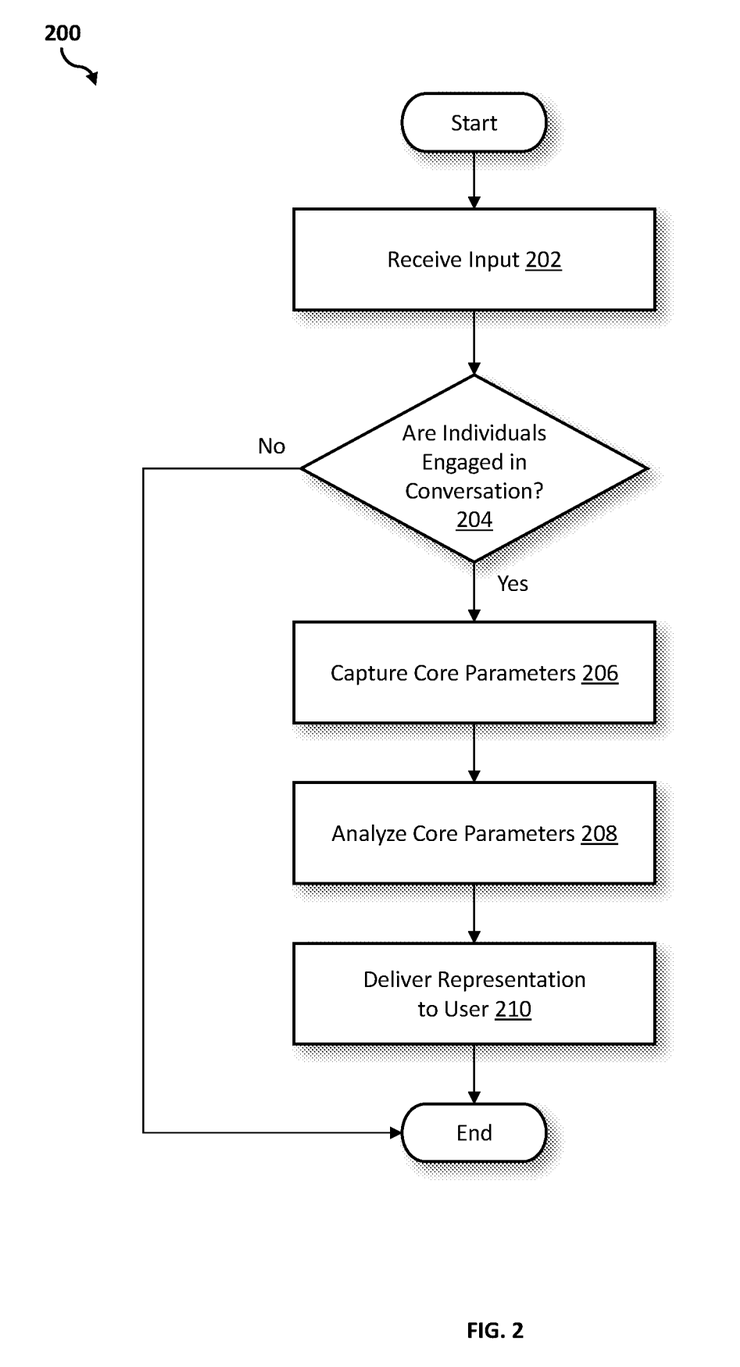
FIG. 2 is an operational flowchart illustrating a process for augmented reality conversation feedback according to at least one embodiment.

Referring now to FIG. 2, an operational flowchart illustrating the exemplary augmented reality conversation feedback process 200 used by the augmented reality conversation program 110a, 110b according to at least one embodiment is depicted.

At 202, an input is received. An input may be received by, for example, an augmented reality device, a computer 102, a handheld device, a smartphone, a tablet or a sensor. An input may consist of various sources. One input source may be, for example, a voice received during communication with the user and the voice may be received by a microphone on a device. One other input source may measure, for example, the distance between the user and the one or more individuals the user is conversing with and the body language (e.g., facing the user, arms crossed or body movements) of the user and one or more individuals the user is conversing with by using a sensor or a camera on a device. Another input source may be, for example, biometric identifiers (e.g., heartbeat, breathing or pupil dilation) and the biometric identifiers may be measured by using a wearable device (e.g., smart watch), by using sensors on a wearable device or by using a camera.

For example, A goes to a business luncheon. A is wearing a smart watch and an augmented reality device such as smart glasses. A activates the smart glasses by turning the power button on. The smart glasses, operating the augmented reality conversation program 110a, 110b may scan the visible area around A and determines, using facial recognition, the direction the individuals at the luncheon are facing and whether the individuals are making eye contact. The smart glasses have a microphone, a camera and a sensor and are able to identify conversations in the room by processing whether or not individuals are facing one another or whether or not the individuals are speaking to one another (i.e., engaged in conversation).

Next at 204, the augmented reality conversation program 110a, 110b determines if the individuals are engaged in the conversation. The received input may be analyzed to determine the level of engagement (i.e., level of interest) in a conversation. The level of engagement may include body language, voice parameters and communication distance. The level of engagement may be analyzed using the received input at step 202. For example, using a camera and a microphone on an augmented reality device, if two individuals are facing each other and are speaking in a direction towards each other, then the augmented reality conversation program 110a, 110b may determine the individuals are engaged in a conversation.

The level of engagement may be quantified by a threshold parameter or a score associated with the level of engagement. A score may represent the likelihood that an event may happen. A threshold parameter may represent a tunable limit of the likelihood of an event. For example, the threshold may be a limit applied to the score to indicate a degree of conversation, such that a low score may be from 0 to 0.5, a medium score may be from 0.5 to 0.75 and a high score may be from 0.75 to 1. When the score is at a set threshold, the representation may be quantified.

Continuing from the previous example and using the threshold parameters stated above, at the luncheon, if B is looking at C, speaking in the direction of C, and B and C are connected and communicate often on social media, then the smart glasses have determined that the level of engagement between B and C is considered to be a conversation with a high level of engagement with a score of 0.90. A may be the user wearing the augmented reality device and the augmented reality device may capture multiple conversations. In this example, A, B and C are in a group conversation at the luncheon.

If the augmented reality conversation program 110a, 110b determines that the individuals are engaged in the conversation at 204, then the core parameters are captured at 206. Core parameters may be captured, for example, by the user's augmented reality device. One core parameter may include the physical proximity (e.g., distance) between the individuals engaged in conversation. For example, a closer proximity in distance captured by a camera or a sensor may indicate a more engaged conversation. The proximity may also be captured using an application with GPS or from a social media post that may contain a user's reported location. One other core parameter may include the level of social media connection. For example, a direct friend is given more weight or is assigned a higher number or score than a friend of a friend. The augmented reality conversation program 110a, 110b may analyze the level of connection between individuals by capturing the social distance between the individuals (i.e., how many hops or connections between individuals engaged in conversation). The larger the social distance, the less weight may be assigned to the conversation.

Another core parameter may include capturing the common interests, such as occupational interests, between the individuals conversing. Common interests posted and common events attended or posted as interested in attending may be captured by accessing social media profiles and interests by querying over a network server that may host social media profiles and calendars. Social media calendars and personal calendars may also be considered when capturing common interests. The higher the number of common interests, the greater weight or higher score may be given. Another core parameter may include the amount of time individuals have spent in communication currently or historically by considering physical conversations and digital conversations (e.g., email applications, social media applications, social network applications or communicating applications). The amount of time (i.e., total time) the individuals engaged in a conversation using the augmented reality device (i.e., recording the live conversation) may be a representation of a physical (i.e., real life) conversation. The number of digital conversations may include, for example, counting the number of emails or messages that were exchanged between the individuals or the number of phone calls that were exchanged and the length of each conversation.

One other core parameter may include the communication distance between mutual friends or professional connections. For example, a professional communication distance may include a company level communication distance and the distance in type of work between individuals, GPS distance between individuals and communication between individuals at the same or a different company may be considered by the augmented reality conversation program 110a, 110b. For example, company history and feedback from individuals after a meeting between different companies may also be considered. Another core parameter may include the quality of conversation. The meaningfulness of a conversation may be measured by considering messages, words, body language and biometric features captured by the augmented reality device or another computing device, for example, a smart phone or a smart watch. One other core parameter may include a social graph and directions in the augmented reality layout of the social graph. A social graph may include, for example, a graphical representation of relationships depicted on a social network. An augmented reality layout of a social graph may be, for example, presented as feedback to a user on the viewable area of the augmented reality device, such as smart glasses. Social graphs may also be presented to a user on smart watches and smart phones in real time.

If the augmented reality conversation program 110a, 110b determines that the individuals are not engaged in the conversation at 204, then the program does not capture further data. For example, A is wearing smart glasses at a networking event. As A walks around the event, A is not engaged in a conversation and the individuals in the viewable area of the smart glasses are also not engaged in a conversation. The augmented reality conversation program 110a, 110b may continually be analyzing the network event for levels of engagement, however, will not capture further core parameter data until a conversation that has reached a preset threshold or score of level of engagement has been detected. For example, if the threshold is set to consider engagement in a conversation at 0.25 and the conversation being encountered by the user and the augmented reality device operating the augmented reality conversation program 110a, 110b is at 0.15, then further data may not be captured. An example of a 0.15 threshold may be A, wearing smart glasses, walks into the networking event and greets B and C, however, A does not stop and begin a conversation, there was only a quick encounter.

Then, at 208, the core parameters are analyzed. The captured core parameter data may be used to analyze whether an individual is known to the user. A known user may be detected by identifying facial characteristics and subsequently associating the characteristics with a user identifier. The augmented reality conversation program 110a, 110b may detect an unknown user by lack of identification and subsequently associating the person with a similar cohort or person. Beginning with a random guess, such as facial features or clothing brand names, the augmented reality conversation program 110a, 110b may subsequently build a model that may represent the user's interest after the interest capture takes place. The model may be smoothed to refine the initial guess rather than model a large dataset. Once an unknown user is detected, the augmented reality conversation program 110a, 110b may assign a communication distance between the user and the person of interest (i.e., individual). The communication distance may be represented by a metric which may be used to indicate the level of engagement between the people within the view.

For example, user A walks around the networking event with an augmented reality device and detects an unknown individual B. The augmented reality conversation program 110a, 110b may calculate key points (e.g., keypoint extraction) of B's facial features and determines who B most likely is. Key points may, for example, be compared between B and user A's social media network of images. The augmented reality conversation program 110a, 110b may now find a new unknown individual, C, and continue calculating to determine who C may be. Since C is unknown to user A, key objects may be retrieved, such as drink, clothing, eyeglasses and watch brands. Higher priced brands of drinks, clothing, eyeglasses and watch may indicate that C has a high net worth and may be classified as such. The augmented reality conversation program 110a, 110b may build a characteristic model of C and optimize the communication distance.

Core parameters may be analyzed during or after the augmented reality device receives structured or unstructured data for processing. For example, during the user's conversation with an individual, the augmented reality device may receive audio content from the individual's voice during the conversation. The NLP processing element may use the audio input to interpret the individual's sentiment by analyzing qualities, such as tone of voice, volume of voice, inflection in words, facial changes, body language and sharpness of voice. The NLP may also process other data received by the user, such as email messages and social media connections and content to determine the level of connection between the user and the individual. The user may be in communication with one other individual or more than one other individual and the augmented reality device may process all conversations. The NLP may also process data received from an augmented reality device in the form of biometric data, pupil size, pupil elongation, heartbeat or breathing patterns.

At 210, the augmented reality representation is delivered to the user. The user may receive the augmented reality representation as an overlay in the viewable area, for example, on an augmented reality device such as smart glasses. An overlay may be shown as, for example, a color shading over an individual whom the user is communicating with (e.g., a green color overlay may signify a meaningful conversation, a yellow color overlay may be considered a neutral conversation and a red color overlay may signify a non-meaningful conversation). An overlay may also be shown as type written data over or near the real image of an individual whom the user is conversing with. The type written data may include words, symbols or images on the augmented reality device. The augmented reality device may also communicate via a communication network 116 with the user's smart watch, smart phone, tablet or computer 102. The communication may provide alerts or messages to the user.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
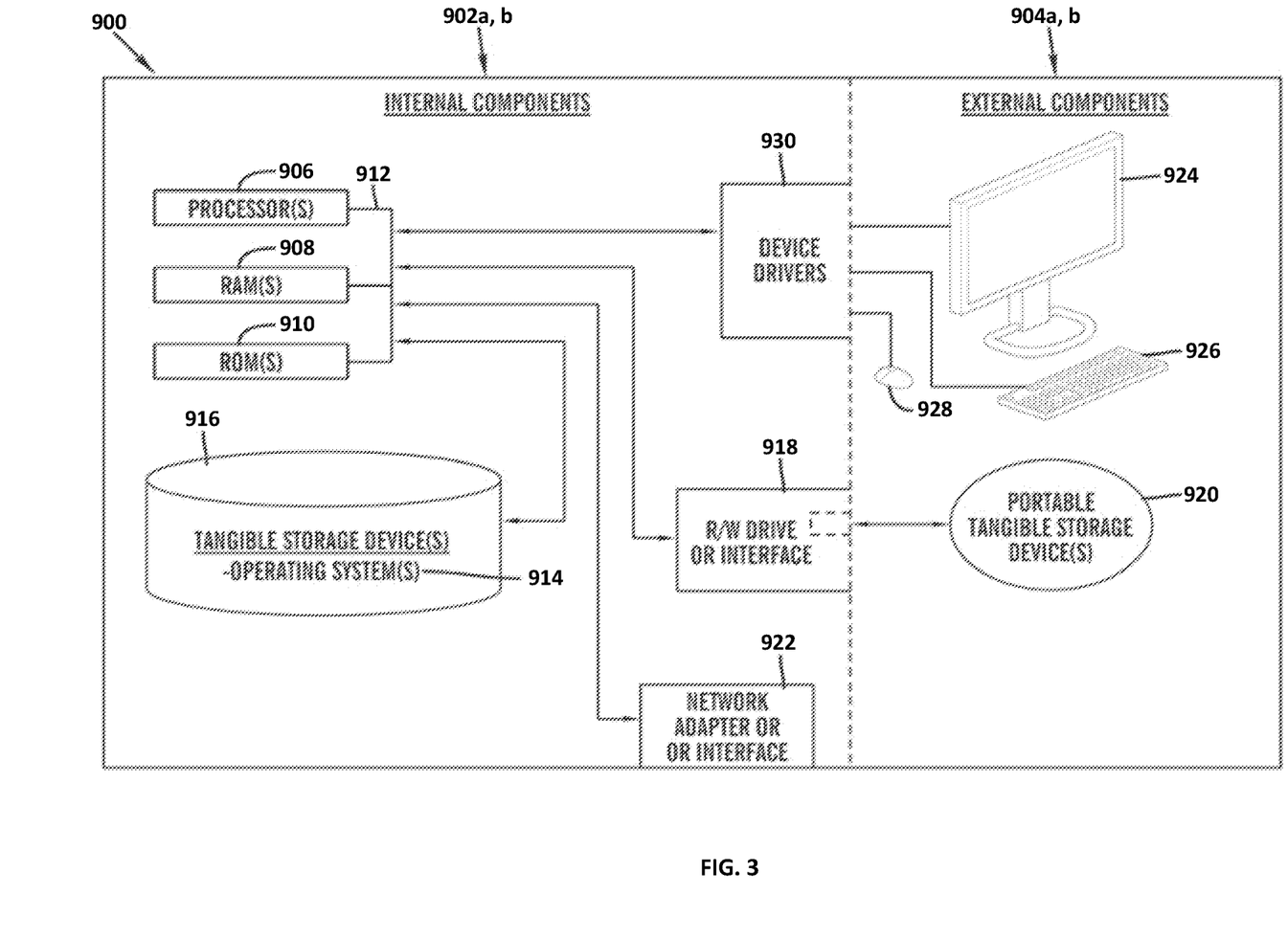
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the augmented reality conversation program 110a in client computer 102, and the augmented reality conversation program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the augmented reality conversation program 110a, 110b can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the augmented reality conversation program 110a in client computer 102 and the augmented reality conversation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the augmented reality conversation program 110a in client computer 102 and the augmented reality conversation program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. External components 904a, b may also include a projected display with haptic feedback, for example, Google Glass, Glass™ wearable computing device (Glass and all Glass based trademarks and logos are trademarks or registered trademarks of Google Incorporated and/or its affiliates). Each of the sets of internal components 902a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
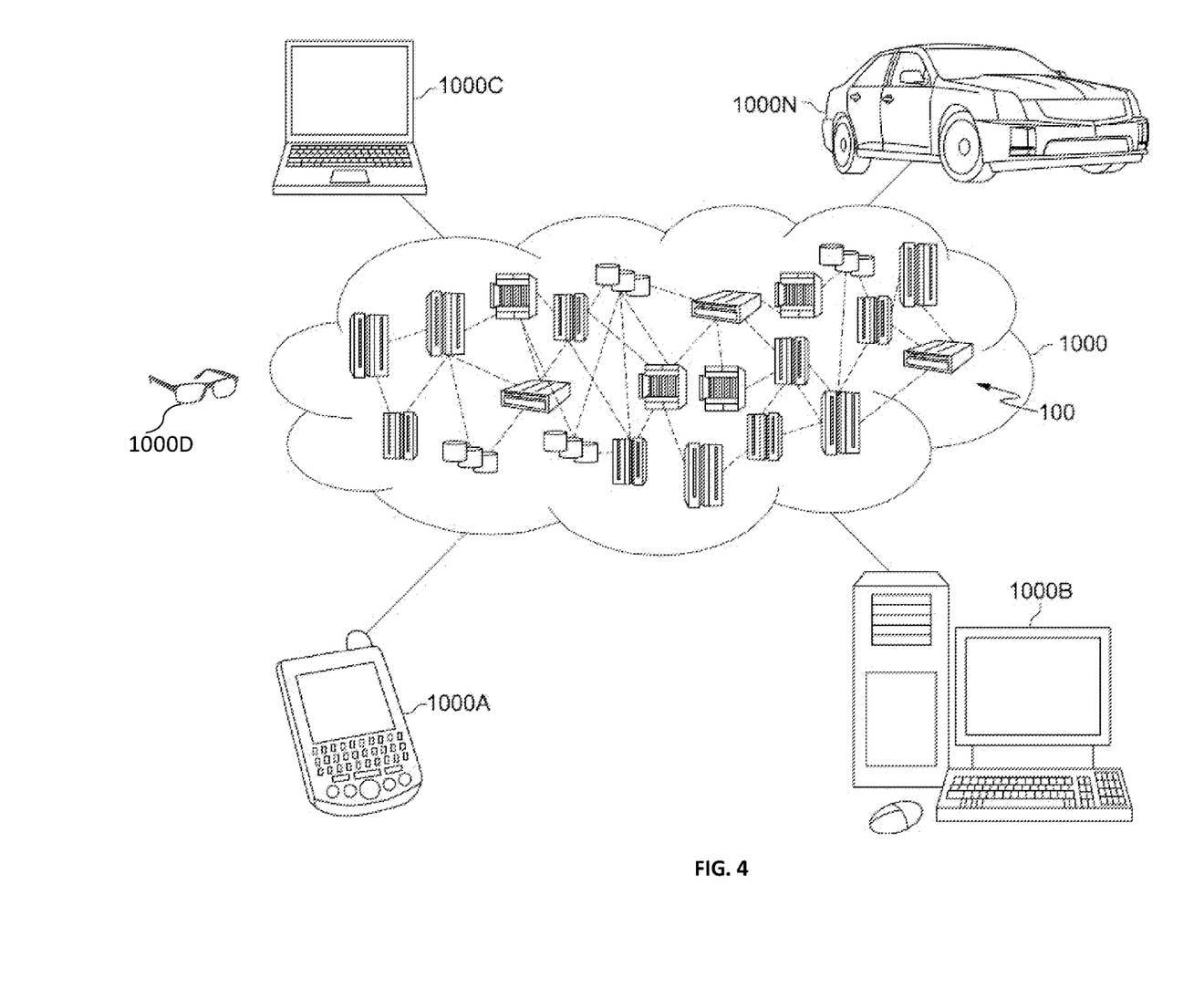
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, augmented reality device 1000D such as a smart phone, a smart watch or smart glasses, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
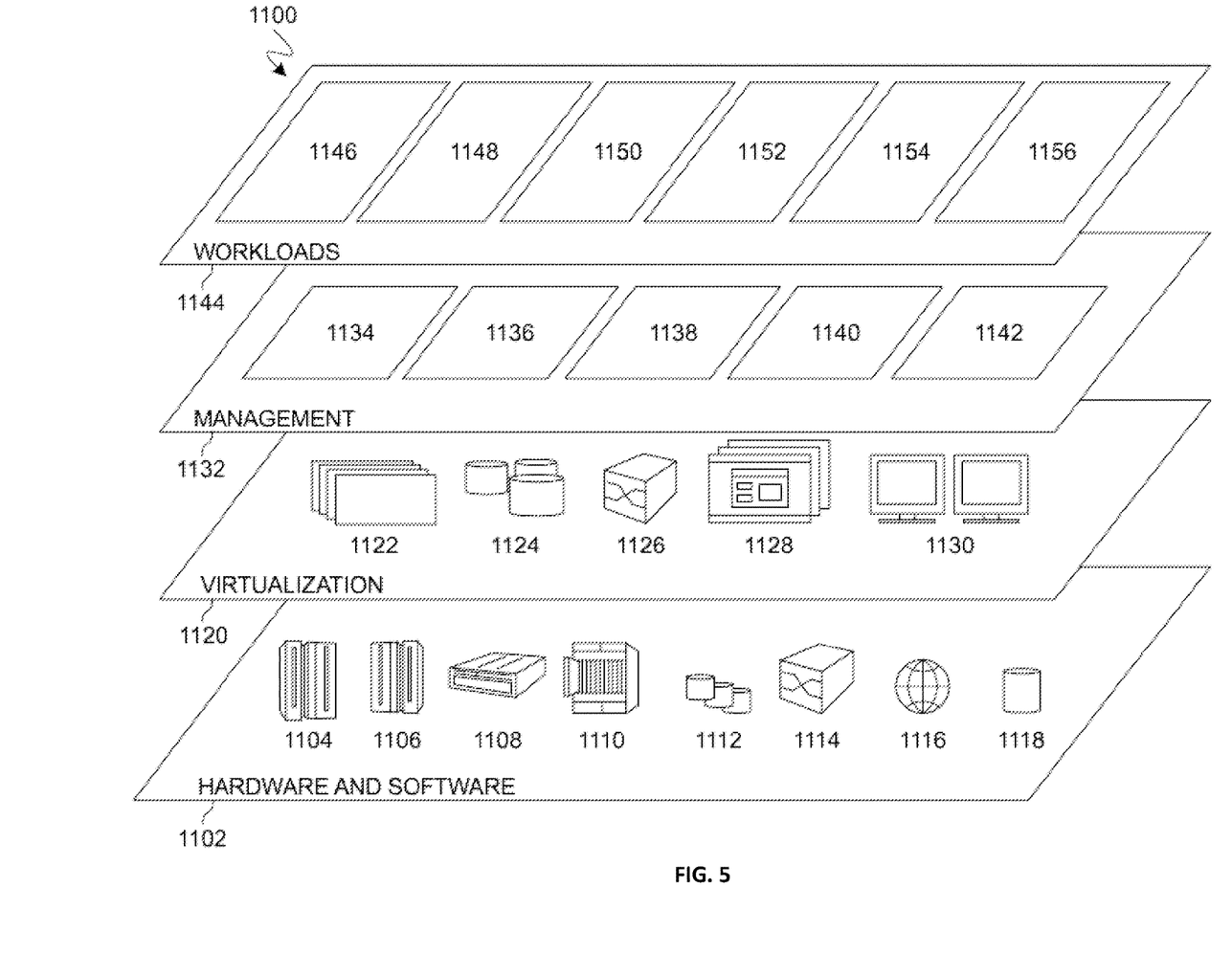
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and augmented reality conversation feedback 1156. An augmented reality conversation program 110a, 110b provides a way to offer feedback to a user regarding the level of engagement that is presented in a conversation to allow the user to adjust the user's approach to the conversation with a particular individual.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for interpreting conversation engagement, the method comprising:
   receiving, by an augmented reality device, an input, wherein the augmented reality device is associated with a user;
   analyzing the received input;
   determining that the user is engaged in a conversation with an individual based on the analyzed input, wherein a level of engagement is used to determine that the user and the individual are engaged in the conversation based on a quantifiable threshold parameter, wherein the quantifiable threshold parameter indicates a degree of conversation, wherein the degree of the conversation is low, medium or high, wherein the degree of conversation of the low, medium and high are scored between 0 and 1, respectively;
   capturing a plurality of core parameters between the user and the individual based on the degree of conversation being medium or high, wherein the plurality of core parameters further quantifies the level of engagement between the user and the individual by assigning a weight to the individual based on a level of connection between the user and the individual;
   determining that the individual is unknown to the user, wherein an intention of the conversation is monitored to indicate a willingness and an ability to speak on a particular topic;
   analyzing the captured plurality of core parameters, wherein a characteristic model is built beginning with a random guess associated with features of the individual and interests of the user, wherein a communication distance is assigned between the user and the individual, wherein the communication distance is optimized for the user by refining the characteristic model, wherein the characteristic model is built using keypoint extraction;
   delivering a representation of the analyzed plurality of core parameters to the user on the augmented reality device; and
   adjusting, by the user, the conversation with the individual based on the representation of the analyzed plurality of core parameters.

2. The method of claim 1, wherein the augmented reality device is a device that has a plurality of features that capture a plurality of core parameter data from a real life interaction between the user and at least one other individual, and wherein the augmented reality device has the plurality of features that capture a plurality of core parameter data from historical sources.

3. The method of claim 1, wherein the received input on the augmented reality device is selected from a group consisting of a plurality of sound of voice data, a plurality of body language data, a plurality of biometric feature data and a location of the user and at least one other individual.

4. The method of claim 1, wherein the captured core parameters include physical proximity between the user and at least one other individual, a social media network connection between the user and at least one other individual, a number of historical common interests between the user and at least one other individual and the communication distance between the user and at least one other individual, wherein the communication distance includes an analysis of known individuals to the user, unknown individuals to the user, mutual friends between the user and the individual, professional network connections between the user and the individual and a physical distance of residence between the user and the individual.

5. The method of claim 1, wherein the captured core parameters are analyzed using natural language processing, sentiment analysis and semantic analysis.

6. The method of claim 1, wherein the plurality of core parameters are analyzed by measuring a quality of the conversation, wherein measurements are selected from a group consisting of a biometric feature, a plurality of words, a plurality of body language and a social graph.

7. The method of claim 1, wherein analyzing the core parameters produces a metric for the augmented reality device to notify the user, and wherein the metric is indicative of a level of engagement in the conversation.

8. A computer system for interpreting conversation engagement, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving, by an augmented reality device, an input, wherein the augmented reality device is associated with a user;
   analyzing the received input;
   determining that the user is engaged in a conversation with an individual based on the analyzed input, wherein a level of engagement is used to determine that the user and the individual are engaged in the conversation based on a quantifiable threshold parameter, wherein the quantifiable threshold parameter indicates a degree of conversation, wherein the degree of the conversation is low, medium or high, wherein the degree of conversation is scored between 0 and 1;
   capturing a plurality of core parameters between the user and the individual based on the degree of conversation being medium or high, wherein the plurality of core parameters further quantifies the level of engagement between the user and the individual by assigning a weight to the individual based on a level of connection between the user and the individual;
   determining that the individual is unknown to the user, wherein an intention of the conversation is monitored to indicate a willingness and an ability to speak on a particular topic;
   analyzing the captured plurality of core parameters, wherein a characteristic model is built beginning with a random guess associated with features of the individual and interests of the user, wherein a communication distance is assigned between the user and the individual, wherein the communication distance is optimized for the user by refining the characteristic model, wherein the characteristic model is built using keypoint extraction;
   delivering a representation of the analyzed plurality of core parameters to the user on the augmented reality device; and
   adjusting, by the user, the conversation with the individual based on the representation of the analyzed plurality of core parameters.

9. The computer system of claim 8, wherein the augmented reality device is a device that has a plurality of features that capture a plurality of core parameter data from a real life interaction between the user and at least one other individual, and wherein the augmented reality device has the plurality of features that capture a plurality of core parameter data from historical sources.

10. The computer system of claim 8, wherein the received input on the augmented reality device is selected from a group consisting of a plurality of sound of voice data, a plurality of body language data, a plurality of biometric feature data and a location of the user and at least one other individual.

11. The computer system of claim 8, wherein the captured core parameters include a physical proximity between the user and at least one other individual, a social media network connection between the user and at least one other individual, a number of historical common interests between the user and at least one other individual and the communication distance between the user and at least one other individual, wherein the communication distance includes an analysis of known individuals to the user, unknown individuals to the user, mutual friends between the user and the individual, professional network connections between the user and the individual and a physical distance of residence between the user and the individual.

12. The computer system of claim 8, wherein the captured core parameters are analyzed using natural language processing, sentiment analysis and semantic analysis.

13. The computer system of claim 8, wherein the plurality of core parameters are analyzed by measuring a quality of the conversation, wherein measurements are selected from a group consisting of a biometric feature, a plurality of words, a plurality of body language and a social graph.

14. The computer system of claim 8, wherein analyzing the core parameters produces a metric for the augmented reality device to notify the user, and wherein the metric is indicative of a level of engagement in the conversation.

15. A computer program product for interpreting conversation engagement, comprising:
   one or more non-transitory computer-readable storage media and program instructions stored on at least one of the one or more non-transitory tangible storage media, the program instructions executable by a processor to cause the processor to perform a method comprising:
   program instructions to receive, by an augmented reality device, an input, wherein the augmented reality device is associated with a user;
   program instructions to analyze the received input;
   program instructions to determine that the user is engaged in a conversation with an individual based on the analyzed input, wherein a level of engagement is used to determine that the user and the individual are engaged in the conversation based on a quantifiable threshold parameter, wherein the quantifiable threshold parameter indicates a degree of conversation, wherein the degree of the conversation is low, medium or high, wherein the degree of conversation is scored between 0 and 1;

program instructions to capture a plurality of core parameters between the user and the individual based on the degree of conversation being medium or high, wherein the plurality of core parameters further quantifies the level of engagement between the user and the individual by assigning a weight to the individual based on a level of connection between the user and the individual;

program instructions to determine that the individual is unknown to the user, wherein an intention of the conversation is monitored to indicate a willingness and an ability to speak on a particular topic;

program instructions to analyze the captured plurality of core parameters, wherein a characteristic model is built beginning with a random guess associated with features of the individual and interests of the user, wherein a communication distance is assigned between the user and the individual, wherein the communication distance is optimized for the user by refining the characteristic model, wherein the characteristic model is built using keypoint extraction;

program instructions to deliver a representation of the analyzed plurality of core parameters to the user on the augmented reality device; and program instructions to adjust, by the user, the conversation with the individual based on the representation of the analyzed plurality of core parameters.

16. The computer program product of claim 15, wherein the augmented reality device is a device that has a plurality of features that capture a plurality of core parameter data from a real life interaction between the user and at least one other individual, and wherein the augmented reality device has the plurality of features that capture a plurality of core parameter data from historical sources.

17. The computer program product of claim 15, wherein the received input on the augmented reality device is selected from a group consisting of a plurality of sound of voice data, a plurality of body language data, a plurality of biometric feature data and a location of the user and at least one other individual.

18. The computer program product of claim 15, wherein the captured core parameters include a physical proximity between the user and at least one other individual, a social media network connection between the user and at least one other individual, a number of historical common interests between the user and at least one other individual and the communication distance between the user and at least one other individual, wherein the communication distance includes an analysis of known individuals to the user, unknown individuals to the user, mutual friends between the user and the individual, professional network connections between the user and the individual and a physical distance of residence between the user and the individual.

19. The computer program product of claim 15, wherein the captured core parameters are analyzed using natural language processing, sentiment analysis and semantic analysis.

20. The computer program product of claim 15, wherein the plurality of core parameters are analyzed by measuring a quality of the conversation, wherein measurements are selected from a group consisting of a biometric feature, a plurality of words, a plurality of body language and a social graph.

* * * * *